United States Patent
Herwig et al.

(10) Patent No.: US 8,494,908 B2
(45) Date of Patent: Jul. 23, 2013

(54) RETAIL CHECKOUT SYSTEM AND METHOD

(75) Inventors: Nathaniel Christopher Herwig, Lawrenceville, GA (US); Daniel F. White, Gainesville, GA (US)

(73) Assignee: NCR Corporation, Duluth, GA (US)

( * ) Notice: Subject to any disclaimer, the term of this patent is extended or adjusted under 35 U.S.C. 154(b) by 594 days.

(21) Appl. No.: 12/338,371

(22) Filed: Dec. 18, 2008

(65) Prior Publication Data
US 2010/0161434 A1  Jun. 24, 2010

(51) Int. Cl.
*G06Q 20/00* (2012.01)

(52) U.S. Cl.
USPC ............................................. 705/16; 705/20

(58) Field of Classification Search
USPC ..................................... 705/16, 20
See application file for complete search history.

(56) References Cited

U.S. PATENT DOCUMENTS

| | | | | |
|---|---|---|---|---|
| 5,640,002 A * | 6/1997 | Ruppert et al. | .......... | 235/462.46 |
| 5,963,134 A * | 10/1999 | Bowers et al. | ............. | 340/572.1 |
| 6,179,206 B1 * | 1/2001 | Matsumori | ................... | 235/383 |
| 6,507,279 B2 * | 1/2003 | Loof | ......................... | 340/572.1 |
| 7,605,705 B2 * | 10/2009 | Kritt et al. | ................. | 340/572.4 |
| 2004/0103034 A1 * | 5/2004 | Reade et al. | .................... | 705/16 |
| 2006/0015435 A1 * | 1/2006 | Nathanson | ....................... | 705/37 |
| 2006/0085297 A1 * | 4/2006 | Minerley | ........................ | 705/28 |
| 2008/0195517 A1 * | 8/2008 | Minerley | ........................ | 705/35 |
| 2009/0192892 A1 * | 7/2009 | Cason | ............................. | 705/14 |

OTHER PUBLICATIONS

Weghorn, Hans, Mobile ticket control system with RFID cards for administering annual secret elections of university committees.(Report). Informatica , 31 , 2 , 161(6). Jun. 2007.*

Metrologic introduces ScanVue an in store price checker with full color graphic advertising capabilities. Nov. 15, 2001. Business Wire, Blackwood, NJ, p. 2522. Retrieved by Dialog QuickSearch on Mar. 28, 2013.*

Extended European Search, Feb. 25, 2010.

* cited by examiner

*Primary Examiner* — Scott Zare
(74) *Attorney, Agent, or Firm* — Paul W. Martin

(57) ABSTRACT

A near field communication (NFC) based checkout system comprises an NFC enabled mobile telephone that reads product data from an NFC tag associated with a product. The mobile telephone updates a shopping list when the consumer scans an item. The consumer uploads the shopping list at a payment terminal at the checkout via an NFC link. The payment terminal connects with a price look up (PLU) database and downloads the price data for the items in the shopping list to provide a total price. The payment terminal requests authorization of the total price from the consumer's financial authorization.

12 Claims, 2 Drawing Sheets

RETAIL CHECKOUT SYSTEM AND METHOD

FIELD OF THE INVENTION

The present invention relates to a retail checkout system and method. More particularly, but not exclusively, it relates to mobile device enabled retail checkout system and method.

BACKGROUND TO THE INVENTION

Self-checkout in retail sales transactions is an area of growing importance to retailers and customers alike. Retailers see benefits in reduced staffing costs, increased stock control and customer satisfaction, whereas customers benefit from the convenience and reduced queuing times associated with self-checkout.

Self-checkout terminals are known where the customer scans their items over a bar code reader at a terminal as they finish their shopping, for example the NCR FastLane supplied by NCR Corporation of Dayton, Ohio. However, this does not give the customer the opportunity of pre-scanning items during their passage around the retail store, prior to reaching the checkout. The provision of a set location for scanning of items results in queues forming at the self-checkout terminals, although reduced in comparison to manually operated checkouts.

An alternative approach to self-checkout is for the retailer to provide hand held barcode scanner for use by customers. This enables a customer to scan their purchases as they pass around the retail store thereby providing a bill for payment as the customer leaves the store. The bill is downloaded from the scanner either by docking the scanner in a docking station or connecting a lead to the scanner. This approach has infrastructural problems associated with it in that the store must provide the hand held scanners for use by the customers. The footprint of docking station where the scanner must be stored for collection by customers uses valuable retail footprint, leading to sub-optimal usage of the retail store. There are also maintenance issue associated with such a system in that the retailer is responsible for maintaining the scanners.

SUMMARY OF THE INVENTION

According to a first aspect of the present invention there is provided a self-checkout system comprising:
at least one NFC tag; and
a near field communication enabled mobile device;
the at least one NFC tag comprising an antenna and a tag processor storing data related to a product associated with the at least one NFC tag;
the mobile device comprising an NFC communication module and a mobile processor; wherein
the NFC communication module is arranged to output an interrogation signal and the antenna being arranged to receive the interrogation signal and to pass the interrogation signal to the tag processor which is arranged to pass the product data related to a product associated with the at least one NFC tag to the antenna in response to receiving the interrogation signal;
the antenna being further arranged to transmit the product data such that the product data is received by the NFC communications module; and
the NFC communications module being arranged to pass the product data to the mobile processor, the mobile processor being arranged to update a list data structure representing a list of items purchased by a user of the mobile device in response to receiving the product data.

Such a system provides a user driven system where the retailer has responsibility for maintaining the check out only.

It will be appreciated that the term NFC as used herein refers to short range, typically less than 20 cm, radio frequency identification (RFID) type technologies.

The at least one NFC tag may be located upon a shelf adjacent the product associated with the at least one NFC tag. The at least one NFC tag may be embedded in a price label on the shelf. The at least one NFC tag may be permanently attached to a shelf location and reprogrammed to reflect a product adjacent to the at least one NFC tag, as said product is changed. Alternatively, or additionally, the at least one NFC tag may be affixed to the product with which it is associated.

The use of an NFC tag provides a low cost, low maintenance means of storing product data.

The tag processor may be arranged to store a security token, for example encryption keys, required to access a network, for example a VPN, or to pass a firewall. This allows shoppers access to the retail outlet's wireless network whilst maintaining the wireless network's integrity from third parties not conducting legitimate transactions.

The system may comprise a retail server comprising a server processor, a data storage device and a server wireless transceiver. The NFC enabled mobile device may comprise a further wireless transceiver. The mobile processor may be arranged to include a request for the security token in the interrogation signal. The tag processor may be arranged to transmit the security token in response to receiving the interrogation signal. The further wireless transceiver may be arranged to transmit request data indicative of the product associated with the NFC tag to the retail server via a wireless network, in response to the mobile processor receiving the product data. The mobile processor may be arranged to insert the security token in the request data. The server wireless transceiver may be arranged to pass the request data to the server processor. The server wireless transceiver may be arranged to pass the request data to the server processor conditional upon the security token being received from the mobile device. The server processor may be arranged to extract pricing data for the product associated with the NFC tag from a price look up (PLU) database stored on the data storage device in response to receiving the request data. The server wireless transceiver may be arranged to transmit the pricing data to the NFC enabled device over the wireless network.

The tag processor may be arranged to store pricing data, associated with the item, locally. The tag processor may be arranged to transmit the pricing data via the antenna, in response to receiving the interrogation signal. This removes the requirement to interrogate the retail server to obtain the pricing data.

The mobile processor may be arranged to update a price entry in the list data structure in response to receiving the pricing data. The processor may be arranged to sum all price entries in a list data structure such that a total price entry is generated in the list data structure.

The system may comprise a payment terminal. The payment terminal may comprise an NFC transceiver unit. The payment terminal may comprise a receipt printer, for example a two sided thermal paper receipt printer. The NFC enabled mobile device may be arranged to copy the list data structure to the payment terminal via an NFC link there between. The payment terminal may be arranged to debit a user's account by an amount corresponding to the total price entry in the list data structure, for example the user's account may be their bank account or a store account.

The provision of a payment terminal coupled to the use of the consumer's own hand held device frees up the footprint taken up by the barcode scanner collection point of the prior art.

In one embodiment, the payment terminal may be connected to a retail server comprising a processor and a data storage device, wherein the data storage device stores a PLU database thereupon. The payment terminal may be arranged to extract pricing data associated with each entry in the list data structure from the PLU database. The payment terminal may be arranged to sum all pricing data extracted from the PLU database and generate a total price datum there from. The payment terminal may be arranged to upload the total price datum to the NFC enabled device. The mobile processor may be arranged to convert the total price datum into a total price entry in the list data structure. The payment terminal may be arranged to upload said pricing data to the NFC enabled device. The mobile processor may be arranged to sum all pricing data uploaded from the payment terminal such that a total price entry is generated in the list data structure.

The use of the PLU table to provide pricing data does not require that every hand held terminal, for example the mobile telephone, needs to maintain an updated product price list. This reduces the memory required to be dedicated on the hand held device to this application.

The mobile processor may be arranged to determine whether the product corresponding to the product data is included on within the list data structure and to create an entry corresponding to said product in the list data structure if it is not. The mobile processor may be arranged to change a flag on an entry on the list data structure in response to receiving the product data. The flag may be arranged to cause a description of the item corresponding to the entry in the list data structure to appear as purchased when displayed on a display of the mobile device. The processor may be arranged to apply a filter to the data structure such only those items that are not flagged as purchased are displayed on the display of the mobile device. The list data structure may comprise a grocery list.

The product data may comprise, but is not limited to, any of the following: ingredients of the product, a possible recipe, health information related to the product, nutritional information related to the product, a product specific allergy warning. The mobile processor may be arranged to generate a prompt at a screen of the mobile device prompting a user to view at least a portion of the product data, and may be arranged to output a user selected portion of the product data at the display, if so selected. The mobile processor may be arranged to generate a prompt at a screen of the mobile device prompting the user to request the pricing data of the item corresponding to the product data from the PLU database. The wireless transceiver may be arranged to request the pricing data from the PLU database in response to the user requesting the pricing data. The mobile processor may be arranged to display at least part of the pricing data at the screen of the mobile device along with a prompt prompting the user whether to purchase the product. The mobile processor may be arranged to update the list data structure only if the user indicates that they wish to purchase the product in response to the prompt.

The mobile processor may be arranged to connect to a remote server via a mobile telecommunications network in response to receiving the product data. The mobile processor may be arranged to interrogate the remote server for pricing data related to a comparable product to that described by the product data, for example in an alternative retail store or an alternative brand. The pricing data of the comparable product may be uploaded to the mobile processor and displayed on a screen of the mobile device. The remote server may append discount data indicative of a pricing discount from the comparable product, for example in the form of an electronic coupon, to the pricing data prior to upload to the mobile processor.

The mobile processor may be arranged to impose a limit on the number of entries in the list data. The mobile processor may be arranged to impose a limit upon the total value of the entries in the list data. The mobile processor may be arranged to cause the price of an item to be displayed upon a screen of the mobile device upon receipt of the item's pricing data. The mobile processor may be arranged to generate a prompt at the screen The NFC enabled mobile device may comprise any of the following: mobile telephone, personal digital assistant (PDA), electronic wallet, smartcard, smart watch, wearable computer.

According to a second of the present invention there is provided a method of self-checkout comprising the steps of:
i) outputting an interrogation signal from an NFC communication module of a mobile device;
ii) receiving the interrogation signal at an antenna of an NFC tag;
iii) passing the interrogation signal to a tag processor of the NFC tag;
iv) passing product data related to a product associated with the at least one NFC tag from the tag processor to the antenna in response to reception of the interrogation signal at the tag processor;
v) transmitting the product data via the antenna such that the product data is received by the NFC communications module of the mobile device;
vi) passing the product data to the mobile processor; and
vii) updating a list data structure stored at the mobile processor, the list data structure representing a list of items purchased by a user of the mobile device in response to receiving the product data.

The method may comprise locating the at least one NFC tag upon a shelf adjacent the product associated with the at least one NFC tag. The method may comprise embedding the at least one NFC tag in a price label on the shelf. The method may comprise attaching the at least one NFC tag to a shelf location permanently and reprogramming the at least one NFC tag to reflect a product adjacent to the at least one NFC tag, as said product is changed. Alternatively, or additionally, the method may comprise affixing the at least one NFC tag to the product with which it is associated. The method may comprise transmitting request data indicative of the product associated with the NFC tag from a further wireless transceiver to a retail server via a wireless network, in response to the mobile processor receiving the product data. The method may comprise extracting pricing data for the product associated with the NFC tag from a price look up (PLU) database stored on the data storage device in response to receiving the request data. The method may comprise transmitting the pricing data from the server to the NFC enabled device over the wireless network. The method may comprise updating a price entry in the list data structure in response to receiving the pricing data via the further wireless transceiver. The method may comprise summing all price entries in a list data structure such that a total price entry is generated in the list data structure.

The method may comprise copying the list data structure to a payment terminal via an NFC link therebetween. The method may comprise debiting a user's account by an amount corresponding to the total price entry in the list data structure by the payment terminal, for example the user's account may be their bank account or a store account.

In one embodiment, the method may comprise connecting a payment unit to a retail server comprising a processor and a data storage device, wherein the data storage device stores a PLU database thereupon. The method may comprise extracting pricing data associated with each entry in the list data structure from the PLU database. The method may comprise summing all pricing data extracted from the PLU database and generating a total price datum therefrom at the pricing terminal. The method may uploading the total price datum to the NFC enabled device. The method may comprise converting the total price datum into a total price entry in the list data structure. The method may comprise uploading the pricing data to the NFC enable mobile device from the payment terminal. The method may comprise summing all price data uploaded from the payment terminal such that a total price entry is generated in the list data structure, at the mobile processor.

The method may comprise allowing a user to interrogate the PLU database upon receipt of the product data. The method may comprise prompting the user whether to purchase the product. The method may comprise updating the list data structure only if the user indicates that they wish to purchase the product in response to the prompt.

The method may comprise determining whether the product corresponding to the product data is included on within the list data structure at the mobile processor and to creating an entry corresponding to said product in the list data structure if it is not. The method may comprise changing a flag on an entry on the list data structure in response to receiving the product data at the mobile processor. The method may comprise causing a description of the item corresponding to the entry in the list data structure to appear as purchased when displayed on a display of the mobile device, dependent upon the condition of the flag. The method may comprise applying a filter to the data structure such only those items that are not flagged as purchased are displayed on the display of the mobile device.

The method may comprise generating a prompt at a screen of the mobile device prompting a user to view at least a portion of the product data, and may be arranged to output a user selected portion of the product data at the display, if so selected.

The method may comprise limiting on the number of entries in the list data.

According to a third aspect of the present invention there is provided a method of providing a consumer price comparison comprising the steps of:

i) uploading product data from an NFC tag associated with a product to an NFC enable mobile device;
ii) accessing of a remote server by the mobile device via a wireless network;
iii) interrogating a database stored at the remote server to determine if data relating to a product comparable to that associated with the product data is present in the database;
iv) transmitting data to the comparable product to the mobile device; and
v) outputting the data to a user of the mobile device via the mobile device.

The method may comprise connecting to a remote server via a mobile telecommunications network in response to receiving the product data, for example a 3G, UMTS, GSM network. The method may comprise interrogating the remote server for pricing data related to a comparable product to that described by the product data, for example in an alternative retail store or an alternative brand. The method may comprise displaying on a screen of the mobile device. The method may comprise appending discount data indicative of a pricing discount from the comparable product, for example in the form of an electronic coupon, to the pricing data prior to upload to the mobile processor.

According to a fourth aspect of the present invention there is provided a mobile device comprising a NFC communications module and a mobile processor;
the NFC communications module being arranged to receive product data from an NFC tag, wherein the product data is indicative of a product associated with the NFC tag and to pass said product data to the mobile processor; and
the mobile processor being arranged to update a list data structure stored at the mobile processor, the list data structure representing a list of items purchased by a user of the mobile device, in response to receiving the product data.

The NFC enabled mobile device may comprise a further wireless transceiver. The further wireless transceiver may be arranged to transmit request data indicative of the product associated with the NFC tag to the retail server via a wireless network, in response to the mobile processor receiving the product data. The NFC communications module may be arranged to receive the pricing data over the wireless network. The mobile processor may be arranged to update a price entry in the list data structure in response to receiving the pricing data via the further wireless transceiver. The processor may be arranged to sum all price entries in a list data structure such that a total price entry is generated in the list data structure.

The NFC enable mobile device may be arranged to copy the list data structure to a payment terminal via an NFC link there between.

The mobile processor may be arranged to convert a total price datum uploaded from the payment terminal into a total price entry in the list data structure. The mobile device may be arranged to upload pricing data from the payment terminal. The mobile processor may be arranged to sum all pricing data uploaded from the payment terminal such that a total price entry is generated in the list data structure.

The mobile processor may be arranged to determine whether the product corresponding to the product data is included on within the list data structure and to create an entry corresponding to said product in the list data structure if it is not. The mobile processor may be arranged to change a flag on an entry on the list data structure in response to receiving the product data. The flag may be arranged to cause a description of the item corresponding to the entry in the list data structure to appear as purchased when displayed on a display of the mobile device. The mobile processor may be arranged to generate a prompt at a screen of the mobile device prompting a user to view at least a portion of the product data, and may be arranged to output a user selected portion of the product data at the display, if so selected.

The mobile processor may be arranged to connect to a remote server via a mobile telecommunications network in response to receiving the product data. The mobile processor may be arranged to interrogate the remote server for pricing data related to a comparable product to that described by the product data, for example in an alternative retail store or an alternative brand. The pricing data of the comparable product may be uploaded to the mobile processor and displayed on a screen of the mobile device. The remote server may append discount data indicative of a pricing discount from the comparable product, for example in the form of an electronic coupon, to the pricing data prior to upload to the mobile processor.

The mobile processor may impose a limit on the number of entries in the list data.

The NFC enabled mobile device may comprise any of the following: mobile telephone, personal digital assistant (PDA), electronic wallet, Smart phone, smartcard, smart watch, wearable computer.

According to a fifth aspect of the present invention there is provided a payment terminal comprising an NFC communications module, a processor and a network connection;

the NFC communications module being arranged to receive list data structure from an NFC enabled mobile device, the list data being indicative of at least one product purchased by a user of the mobile device;

the processor being arranged to request payment from a remote host based upon an account identifier and a total price datum contained within the list data.

The payment terminal may comprise a printer arranged to print a receipt detailing the items detailed in the list data structure. The printer may comprise a thermal printer. The printer may comprise a two sided thermal printer.

According to a sixth aspect of the present invention there is provided software which when executed on a processor of a mobile device causes the processor to update a list data structure stored at the mobile processor, the list data structure representing a list of items purchased by a user of the mobile device, in response to receiving product data associated with a product from an NFC communications module of the mobile device.

The software may cause the processor to update a price entry in the list data structure in response to receiving the pricing data via the further wireless transceiver. The software may cause the processor to sum all price entries in a list data structure such that a total price entry is generated in the list data structure. The software may cause the processor to output a copy of the list data structure via the NFC communications module to a payment terminal. The software may cause the processor to determine whether the product corresponding to the product data is included on within the list data structure and to create an entry corresponding to said product in the list data structure if it is not. The software may cause the processor to impose a limit on the number of entries in the list data.

The software may cause the processor to instigate a connection to a remote server via a mobile telecommunications network in response to receiving the product data. The software may cause the processor to interrogate the remote server for pricing data related to a comparable product to that described by the product data, for example in an alternative retail store or an alternative brand. The software may cause the processor to upload the pricing data of the comparable product and to output the pricing data of the comparable product on a screen of the mobile device.

The software may cause the processor to change a flag on an entry on the list data structure in response to receiving the product data. The flag may be arranged to cause a description of the item corresponding to the entry in the list data structure to appear as purchased when displayed on a display of the mobile device. The software may cause the processor to generate a prompt at a screen of the mobile device prompting a user to view at least a portion of the product data, and may be arranged to output a user selected portion of the product data at the display, if so selected.

BRIEF DESCRIPTION OF THE DRAWINGS

The present invention will now be described, by way of example only, with reference to the accompanying in drawings, in which.

DETAILED DESCRIPTION OF PREFERRED EMBODIMENTS

Figure 1:
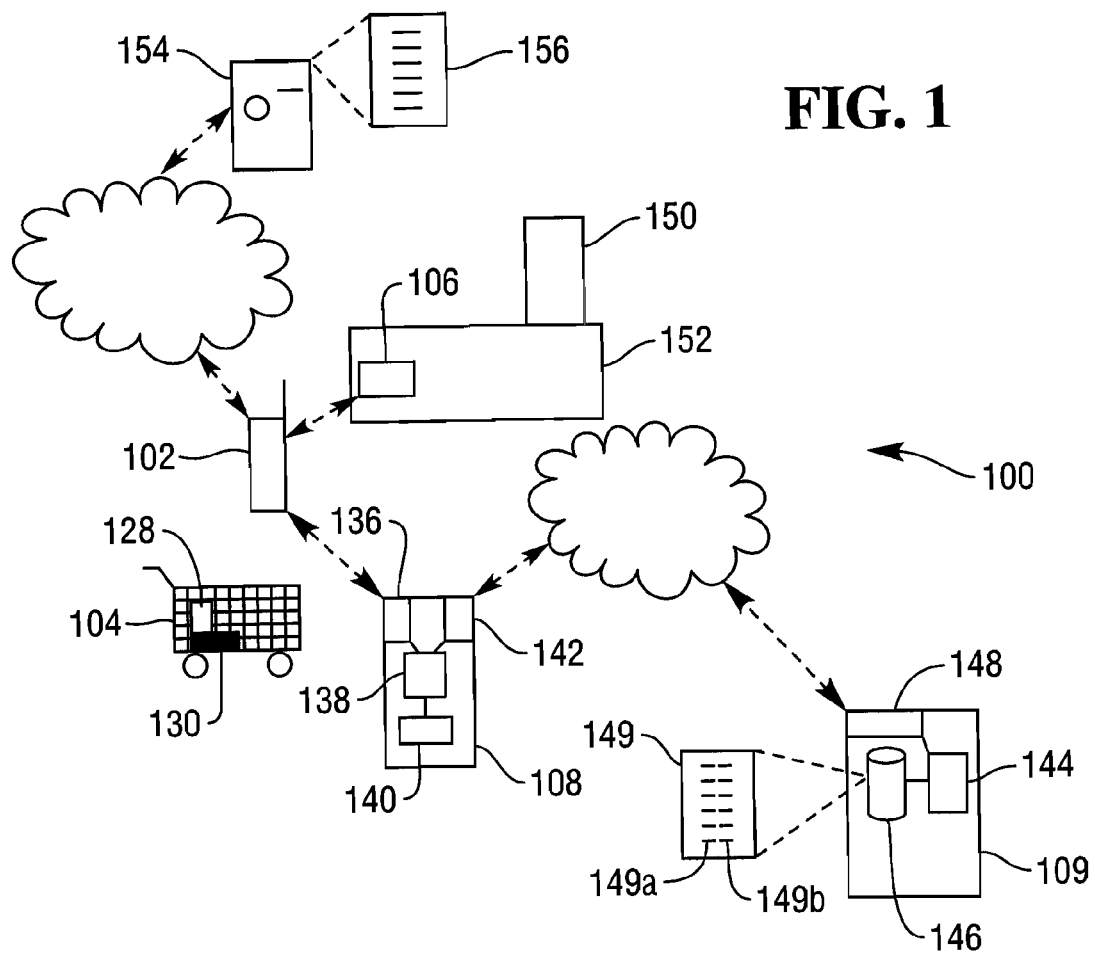
FIG. 1 is a schematic diagram of a retail checkout system according to an aspect of the present invention.
Figure 2:
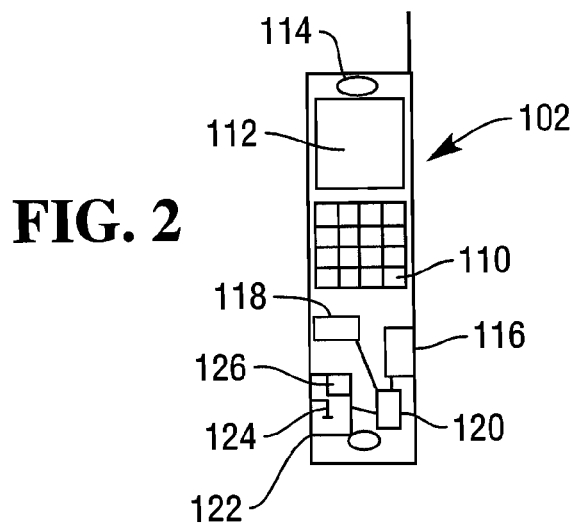
FIG. 2 is a schematic diagram of a mobile telephone of the system of FIG. 1.
Figure 3:
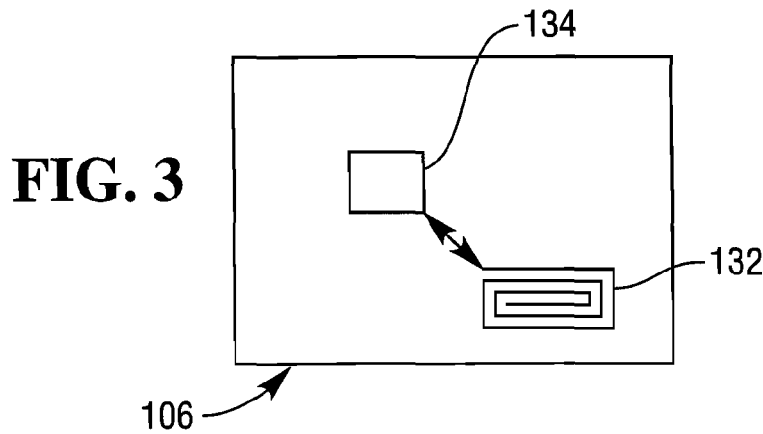
FIG. 3 is a schematic diagram of a NFC tag of the system of FIG. 1.

Referring now to FIGS. 1 to 3, a retail checkout system 100 comprises a mobile telephone 102, a cart 104, an NFC product tag 106, a payment terminal 108 and a retail server 109.

The mobile telephone 102 comprises a keypad 110, a screen 112, a speaker 114, a wireless transceiver, 116, a cellular transceiver 118, a processor 120 and an NFC module 122.

Typically, the wireless transceiver 116 is a 802.11 Wifi, or a Bluetooth transceiver. However, Wimax, cell networks, or Zigbee transceivers are also possible wireless transceivers. The invention will be described with reference to a Bluetooth transceiver.

The NFC module 122 comprises an antenna 124 and a connector 126. The connector 126 places the antenna 124 in communication with the processor 120. The processor 120 is operable to modulate and demodulate radio-frequency signals and to generates an interrogation signal.

Typically, for high frequency, 3-30 MHz applications the antenna 124 is a lithographically formed metal spiral. For ultra high frequency applications, 300 MHz-3 GHz, a bent or meandered dipole antenna 124 with impedance matching to the processor 120 may be used.

Usually, the wireless transceiver 116 operates in the frequency band between 2.4-2.4835 GHz. Typically, the frequency band is divided into seventy nine 1 MHz wide sub-channels. Usually, the transceiver is arranged to hop between sub-channels up to one thousand six hundred times per second wherein the hopping sequence derives from the address and clock of one of two connected devices, known as the master device, and is pseudo-random.

The cart 104 comprises bag holders 128 and security scales 130.

The NFC product tag 106 comprises an antenna 132 and a processor 134. The processor 134 modulates and demodulates radio-frequency signals and stores product data locally.

In the present embodiment the NFC tag 106 will be described with reference to a passive device with no internal power source in which power for generating an output signal is derived from a signal receive at the antenna. However, it will be appreciated that the present invention is equally applicable to semi-passive and active NFC modules as it is to passive RFID tags. A semi-passive module incorporates a power source that powers the IC. An active module comprises a power source that powers the IC and provides power to the output of a broadcast signal in response to an interrogation signal.

Typically, the NFC tag 106 emits and receives electromagnetic radiation at 13.56 MHz with a 2.0 MHz bandwidth and usually supports data rates of 106 Kbps$^{-1}$ using modified Miller coding with 100% modulation, or 212 or 424 Kbps$^{-1}$ using Manchester coding with a 10% modulation ratio. A typical effective range of an NFC tag is between 5 and 20 cm, usually 15 cm or less.

The payment terminal 108 comprises an NFC module 136, a processor 138, a printer 140 and a network connection 142. Typically, the printer 140 is a thermal printer, and may be a two sided thermal printer.

The retail server 109 comprises a processor 144, a data storage device, typically in the form of a magnetic disc 146 and a wireless transceiver 148. The wireless transceiver 148 will have a complementary operating protocol to the wireless transceiver 116 of the mobile telephone 102.

The data storage device 146 has a price look up (PLU) database 149 stored upon it. The PLU database 149 comprises entries comprising identifiers 149a for items, usually all items, stocked by the retailer and their corresponding pricing data 149b.

In use, a retailer places an item 150 on a shelf 152, the item has the NFC tag 106 associated with it. The processor 134 has details of the item 150 stored upon it. Examples the price, details of the manufacturer, a store code, a description of the item 150.

A consumer owning the mobile telephone 102 can enter a list of items that they wish to purchase into the mobile telephone's processor 120. Typically, this is achieved by downloading a pre-produced list from a PC, selecting items from a menu on the mobile telephone or entering item descriptions into the mobile telephone 102 via the keypad 110. Usually, the entry of a list into the processor 120 is optional.

The consumer activates the mobile telephones NFC module 122, typically via the keypad 110. Upon finding an item 150 that they wish to purchase the user places the mobile telephone 102 close, typically within 5-15 cm, to the NFC tag 106. The NFC module 122 receives an interrogation signal generated at the processor 120. The interrogation signal is output via the antenna 124.

The interrogation signal is received at the antenna 132 of the NFC tag 106. The processor 134 of the NFC tag 106 demodulates the interrogation signal, for example in the case of a backscattering passive tag by means of a Schottky diode that is impedance matched to the antenna 120. The processor 134 then determines if the interrogation signal is valid, for example by checking for an embedded security code within the signal. If the interrogation signal is valid, the processor 134 generates a product signal bearing some, or all, of the item details stored at the processor 134, at least a product identifier of the item and its price will be encoded within the product signal. The product signal is output via the antenna 132. The product signal is received by the antenna 124 of the mobile telephone's NFC module 122. It passes to the processor 120 via the connector 126, where it is demodulated and the product data extracted. In some embodiments, the customer receives a prompt on the screen 112 of the mobile phone 102 to confirm that they wish to purchase the item 150. The prompt may contain pricing information about the item, confirmation usually proceeds via the consumer pressing a key on the keypad 110. If the customer rejects the item no further action is taken, a timeout period may be set where a consumer is presumed to have rejected the item if its purchase is not confirmed within the timeout period. This prevents items being added to the consumer's list when they have merely picked up the item to browse.

In some embodiments, the prompt may also ask the consumer whether they wish to view the price of the item before confirming the purchase, in these embodiments the mobile telephone 102 connects to the retail server 109 and interrogates the PLU database 149 as described in detail hereinafter. The user confirms or rejects the purchase of the item 150, as described hereinbefore, once the pricing data is displayed on the screen 112 of the mobile telephone 102. Such an arrangement allows for browsing of items with knowledge of their prices.

If a list data structure, hereinafter referred to as "the list", exists at the processor 120, the processor cross-references the product identifier contained within product data with entries upon the list. Typically, if the product identifier corresponds to an item on the list the processor 120 sets a first flag associated with the item's entry in the list is incremented to indicate that one instance of the item has been purchased. When the flag value equals the number of instances required in the list a second flag is set to "purchased". If an item is scanned, and where applicable, confirmed for purchase by a user that is not on the preloaded list a new entry is made in the list corresponding to the additional item.

If no list is preloaded on to the mobile telephone 102, the processor 120 creates the list upon the first item 150 being scanned and, where applicable, confirmed for purchase by the consumer. Each time an item is scanned a new entry is created on this list.

In one embodiment, the tag processor 134 stores pricing data of the item with which the tag 106 is associated with, and the product data transmitted to the mobile telephone 102 comprises the pricing data. The processor 110 creates a price entry in the list with the unit price received from the tag 106, if a number of identical items 150 are purchased using the mobile telephone 102 a suitable multiplier is used to generate the total price for those items, this total price is stored as the price list entry for the items.

In an alternative embodiment, the processor 126 stores the connection data required to establish a wireless connection between respective wireless transceivers 116, the mobile telephone 102 and the retail server 109. Typically, the connection data includes, but is not limited to, the mobile telephones forty eight bit address, the passkey required to establish a trusted relationship, the device class, a list of services provided by the device, and technical information associated with the device, for example, device features, manufacturer, wireless specification used, clock offset.

Once authorised the wireless device discovery phase is entered into with discovery information being exchanged between the mobile telephone 102 and the retail server 109. Typical discovery information includes, but is not restricted to the wireless device address of the mobile telephone 102 and the retail server 109, and the cryptographic information required to establish a secure data link. Either mobile telephone 102 or the retail server 109 establishes a wireless connection with the other using the respective wireless address exchanged during the device discovery phase. The other data exchanged during the device discovery phase is used in the authentication phase of pairing the wireless devices. The pairing of the mobile telephone 102 and the retail server 109 may be implemented as either read only or read/write. If one side is read only, a one way authentication is performed. If both sides are read/write, a two-way authentication is performed. The respective wireless transceivers of the mobile telephone 102 and the retail server 109 establish a wireless connection data there between, typically using the Link Manager Protocol (LMP). Typically, the LMP manages the continuation of the data link including authentication between the handset and SST and, where appropriate encryption of data.

The mobile telephone's processor 110 issues a request for pricing data from the PLU database 149 via the wireless link established between the mobile telephone 102 and the retail server 109, in response to the item's product data being added to the list. The request for pricing data comprises the item identification data, typically an item code, contained in the product signal received by the mobile telephone 102 from the tag 106. The PLU database 149 correlates the data contained within the request for pricing data with the identifiers 149a contained in the PLU database 149 in order to extract the relevant pricing data 149b. The pricing data 149b is transmitted via the wireless link to the mobile telephone 102 where the processor 110 creates a price entry in the list with the unit price downloaded from the retail server 109, if a number of identical items 150 are purchased using the mobile telephone 102 a suitable multiplier is used to generate the total price for those items, this total price is stored as the price list entry for the items. In at least one application, the tag processor 134 stores a security token required to access the store's wireless network and transmits this to the mobile telephone in response to receiving the interrogation signal. This security token in inserted into the request data, or transmitted separately to it, such that the retail server 109 will only establish a network connection with the mobile telephone 102 if it is in receipt of the security token.

In at least one embodiment, once the pricing data 149b is received at the processor 120 a request for comparison information which contains the product identifier is generated at the processor 120. The comparison request is sent to a remote host 154 via the cellular transceiver 118. The remote host 154 maintains a comparison database 156 of comparable products, the comparable products may be similar products made by different producers in the same retail outlet and/or they may be products available in different retail outlets. The remote host searches the entries in the comparison database 156 and prepares comparison data for transmission to the mobile telephone 102. The comparison data may include electronic discount coupons for a particular brand provided in the retail outlet, or for an alternative retail outlet, to entice the consumer to either change product brand or change retail outlet.

The consumer places their purchased items into a bag held by the bag holder 128 such that they are registered by the security scales 130. The security scales 130 operate in a manner known to the person skilled in the art.

Irrespective of whether the pricing data is downloaded from the tag 106, or uploaded from the PLU database of the retail server 109, once the consumer has completed their shopping they take the shopping cart 104 to the payment terminal 108. The respective NFC communication modules 122, 136 of the mobile telephone 102 and the payment terminal 108 establish a communication channel substantially as described hereinbefore. The processor 120 uploads the list data to the payment terminal 108 via the communication channel and the payment terminal 108 opens a connection to a payment authorisation host (not shown), via a network connection 142. Typically, the authorisation host is that of a financial institution with whom the consumer has a bank account or a store/charging account. The total value of the items purchased by the consumer is sent to the authorisation host for authorisation in a manner known to those skilled in the art.

The list contains both item descriptions and pricing data, this is formatted by the processor 138 and a receipt printed at the receipt printer 140 following authorisation of the transaction by the remote authorisation host. Typically, the receipt printer 140 is a thermal printer and may be a two sided thermal printer. In some embodiments, the consumer has the option to request a printed receipt or not. Typically, this setting is made via the mobile telephone's key pad 110 in response to a prompt presented on the screen 112. The user's printing preference is encoded as a flag in the list is thus downloaded to the payment terminal 108.

Figure 4:
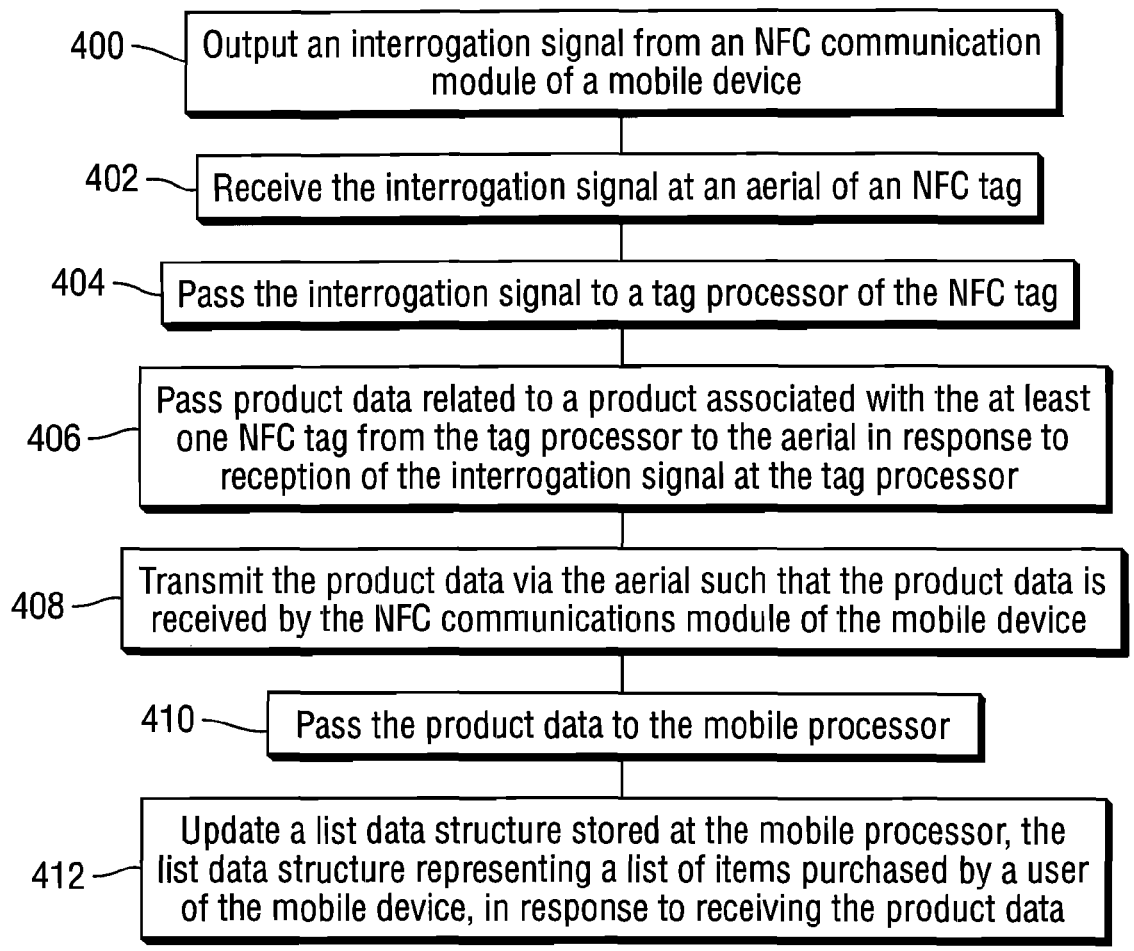
FIG. 4 is a flowchart detailing a method of retail checkout according to an aspect of the present invention.

Referring now to FIG. 4, a method of self-checkout comprises outputting an interrogation signal from an NFC communication module of a mobile telephone (Step 400). An antenna of an NFC tag receives the interrogation signal (Step 402). The interrogation signal is passed to a tag processor of the NFC tag (Step 404). The tag processor passes product data, related to a product associated with the NFC tag, to the antenna in response to receipt of the interrogation signal (Step 406). The antenna transmits the product data such that the product data is received by the NFC communications module of the mobile telephone (Step 408). The product data is passed to the mobile processor (Step 410). The mobile processor updates a list data structure stored at thereupon, the list data structure representing a list of items purchased by a user of the mobile device in response to receiving the product data. (Step 412).

It will be appreciated that, in at least one embodiment, the present invention is provided as a premium service to consumers having membership of a retail store loyalty program. Alternatively, or additionally, the present invention will, in some embodiments be provided as a premium service for which customers will pay a fee to the store.

It will be further appreciated that, in at least one embodiment, a predetermined limit may be placed upon the number of items that can be purchased using the present invention. This may be achieved by encoding such a limit in software downloaded on to the consumer's mobile telephone. Such a limit may be subject to change or removal with software updates.

It will be appreciated that although described with reference to a mobile telephone the present invention is equally applicable to any mobile device, for example a personal digital assistant (PDA) or an electronic wallet.

Various modifications may be made to the above described embodiment without departing from the spirit and the scope of the invention.

The invention claimed is:

1. A checkout system comprising:
   a mobile telephone operated by a customer including
      a cellular communication module for completing customer telephone calls;
      a wireless network communication module;
      a near field communication (NFC) radio frequency (RF) module;
      a mobile processor;
      a display; and
      an input device
   wherein the NFC RF module is for sending a wireless interrogation signal for interrogating an NFC RF tag on a product, for receiving product data related to the product from the NFC RF tag, and for passing the product data to the mobile processor; and
   wherein the mobile processor is for updating a list data structure representing a list of items selected for purchase by the customer in response to receiving the product data;
   wherein the wireless network communication module is for establishing a secure connection with a server containing information about the product in response to a control signal from the mobile processor, for sending a request for the price of the product to the server after connecting, and for receiving the price from the server;
   wherein the mobile processor is also for displaying the price prior to customer selection of the product, timing a timeout period following display of the price, determining whether the input device has recorded customer acceptance of the product before expiration of the timeout period, and including the product in the list data structure only when the input device has recorded the customer acceptance of the product before the expiration of the timeout period.

2. The system of claim 1, wherein the product data comprises product identification data.

3. The system of claim 2, wherein the product data further comprises product price data.

4. The system of claim 1, wherein the wireless network communication module is also for receiving discount data indicative of a pricing discount from the server.

5. The system of claim 1, wherein the mobile processor is also for updating a price entry in the list data structure in response to receiving the price via the wireless network communication module.

6. The system of claim 1, wherein the mobile processor is also for summing price entries in the list data structure such that a total price entry is generated in the list data structure.

7. The system of claim 1, wherein the mobile processor is also for determining whether the product is included within the list data structure, and for creating an entry corresponding to the product in the list data structure if the product is not within the list data structure.

8. The system of claim 1, wherein the NFC RF module is also for sending a copy of the list data structure to a payment terminal during checkout.

9. A checkout method comprising:
sending an interrogation signal from a near field communication (NFC) radio frequency (RF) module within a mobile cellular telephone operated by a customer to interrogate an NFC RF tag on a product;
receiving product data from the NFC RF tag by the NFC module;
updating a list data structure stored within the mobile cellular telephone by a processor within the mobile cellular telephone in response to receiving the product data; and
establishing a secure connection with a server by a wireless networking module within the mobile cellular telephone;
sending the product data to the server by the wireless networking module; and
receiving price data from the server by the wireless networking module;
displaying the price data by a display of the mobile cellular telephone;
timing a timeout period by the processor;
determining whether the input device has recorded customer acceptance of the product before expiration of the timeout period by the processor; and
including the product in the list data structure by the processor only when the input device has recorded the customer acceptance of the product before the expiration of the timeout period.

10. The method of claim 9, further comprising receiving discount data indicative of a pricing discount from the server by the wireless networking module.

11. The method of claim 9, further comprising updating a price entry in the list data structure by the processor in response to receiving the price data via the wireless network communication module.

12. The method of claim 9, further comprising sending a copy of the list data structure to a payment terminal by the NFC RF module via another NFC RF module of the payment terminal during checkout.

* * * * *